US012600499B2

(12) United States Patent
Le Gonidec et al.

(10) Patent No.: US 12,600,499 B2
(45) Date of Patent: Apr. 14, 2026

(54) REFRIGERATION METHOD USING AN ARTIFICIAL NEURAL NETWORK

(71) Applicant: ARIANEGROUP SAS, Paris (FR)

(72) Inventors: Serge Le Gonidec, Vernon (FR); Charles-Hubert Bachelet, Vernon (FR); Sébastien Reichstadt, Vernon (FR); Anne-Laure Wozniak, Vernon (FR)

(73) Assignee: ARIANEGROUP SAS, Paris (FR)

( * ) Notice: Subject to any disclaimer, the term of this patent is extended or adjusted under 35 U.S.C. 154(b) by 533 days.

(21) Appl. No.: 17/759,893

(22) PCT Filed: Feb. 1, 2021

(86) PCT No.: PCT/FR2021/050177
§ 371 (c)(1),
(2) Date: Aug. 1, 2022

(87) PCT Pub. No.: WO2021/156561
PCT Pub. Date: Aug. 12, 2021

(65) Prior Publication Data
US 2023/0341088 A1 Oct. 26, 2023

(30) Foreign Application Priority Data
Feb. 4, 2020 (FR) ...................................... 2001092

(51) Int. Cl.
*B64G 1/40* (2006.01)
*F02K 9/42* (2006.01)
(Continued)

(52) U.S. Cl.
CPC ............. *B64G 1/402* (2013.01); *B64G 1/401* (2013.01); *F02K 9/425* (2013.01); *F02K 9/44* (2013.01); *F02K 9/58* (2013.01)

(58) Field of Classification Search
None
See application file for complete search history.

(56) References Cited

U.S. PATENT DOCUMENTS 5,267,437 A * 12/1993 Foust ........................ F02K 9/50
60/206
5,873,239 A * 2/1999 Culver ..................... G21D 5/02
376/318

(Continued)

FOREIGN PATENT DOCUMENTS

FR 2994731 A1 2/2014
KR 20170012550 A * 2/2017 ............. G01F 9/005

OTHER PUBLICATIONS

International Search Report issued in International Application PCT/FR2021/050177 on May 4, 2021 (4 pages).

*Primary Examiner* — Jenna M Maroney
(74) *Attorney, Agent, or Firm* — Bookoff McAndrews, PLLC

(57) ABSTRACT

A method for chilling down a cryogenic fluid supply circuit including a step of acquiring a state value of the cryogenic fluid supply circuit at a current time, a step of computing a corresponding opening time of each out of one or more valves of the cryogenic fluid supply circuit, and a step of opening each valve at the corresponding time to chill down the cryogenic fluid supply circuit. The step of computing is carried out by a computer applying an artificial neural network to compute a sequence of opening of the valves making it possible to reach, starting from the state value of the cryogenic fluid supply circuit at the current time, a state of the cryogenic fluid supply circuit meeting one or more predetermined chill down criteria at a predetermined time in the future.

14 Claims, 4 Drawing Sheets

(51) Int. Cl.
  *F02K 9/44* (2006.01)
  *F02K 9/58* (2006.01)

(56) References Cited

U.S. PATENT DOCUMENTS

| 2010/0070098 | A1 | 3/2010 | Sterzing et al. | |
|---|---|---|---|---|
| 2013/0247542 | A1* | 9/2013 | Le Gonidec | F02K 9/00 |
| | | | | 60/200.1 |
| 2017/0101963 | A1* | 4/2017 | Klein | F02K 9/563 |
| 2017/0175680 | A1* | 6/2017 | Romet | G06N 3/047 |
| 2017/0205266 | A1* | 7/2017 | Le Gonidec | G01F 9/001 |
| 2023/0341088 | A1* | 10/2023 | Le Gonidec | F17C 1/12 |

* cited by examiner

[Fig. 1]
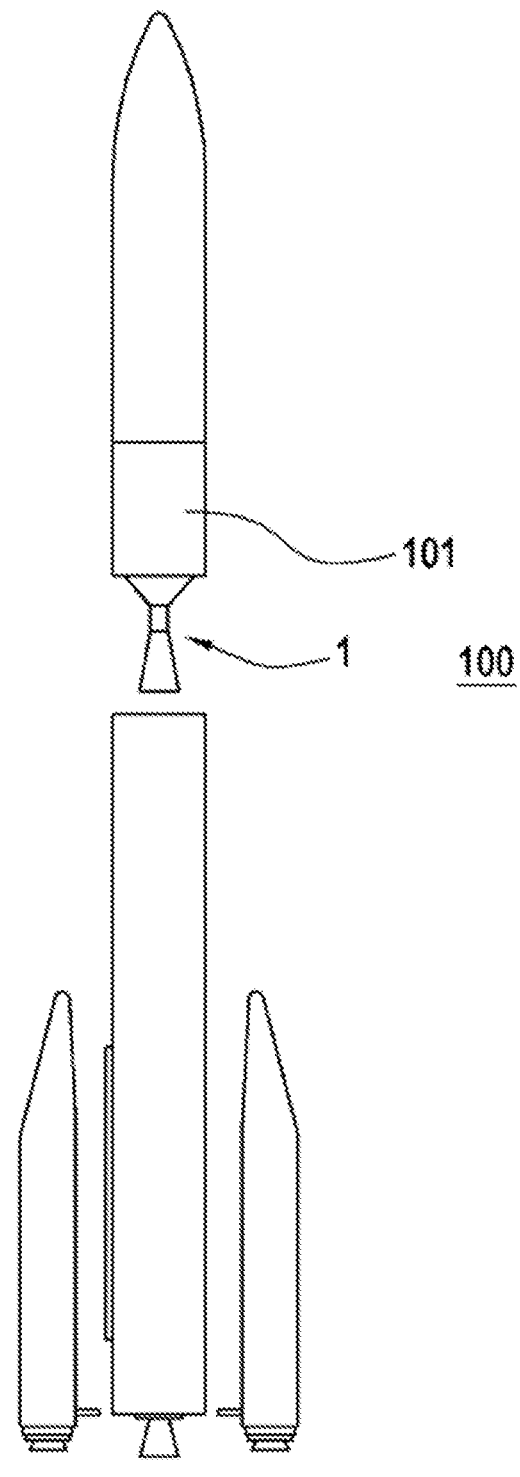

[Fig. 2]
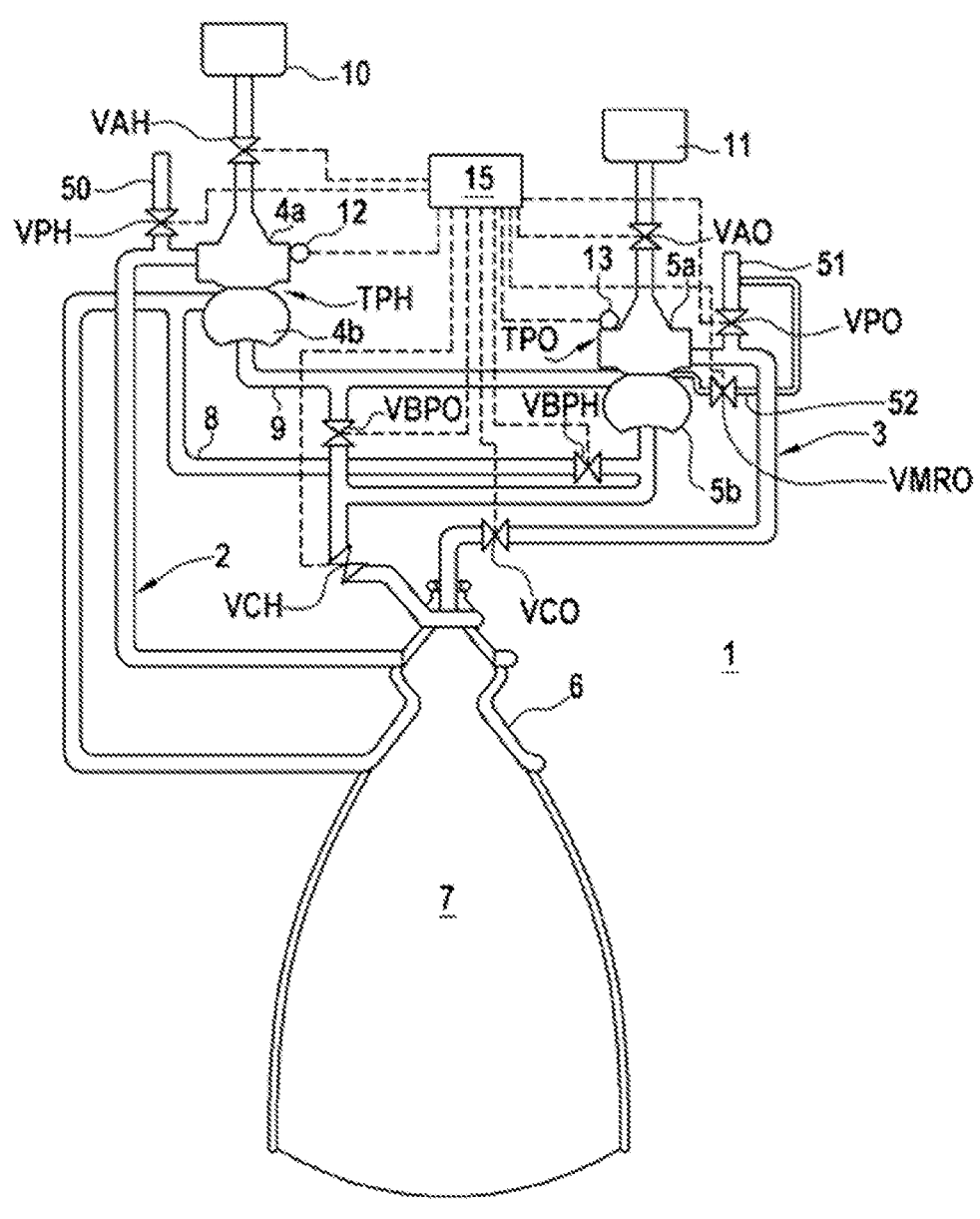

[Fig. 3]
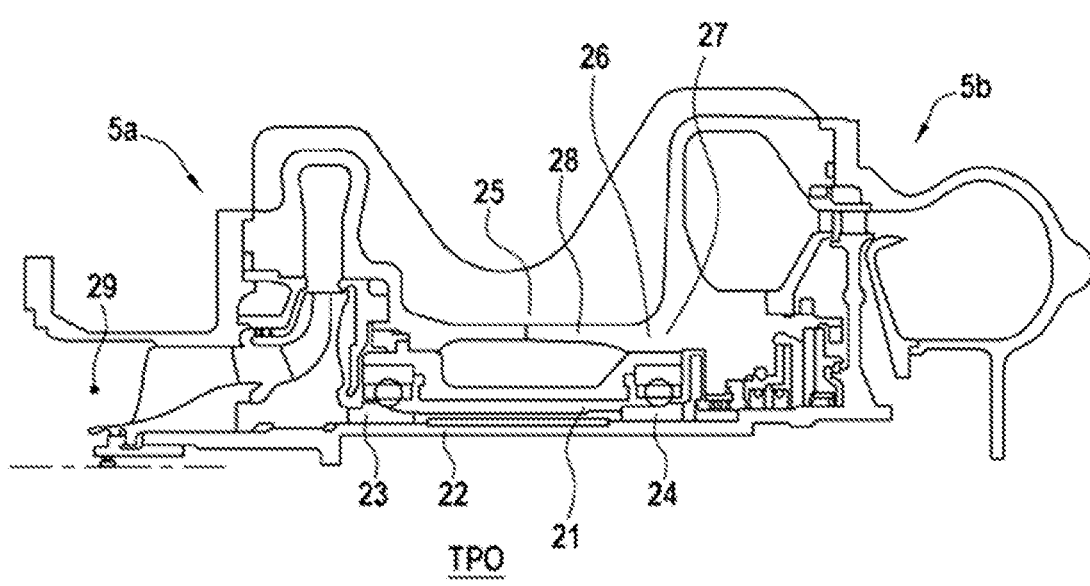
TPO
[Fig. 4]
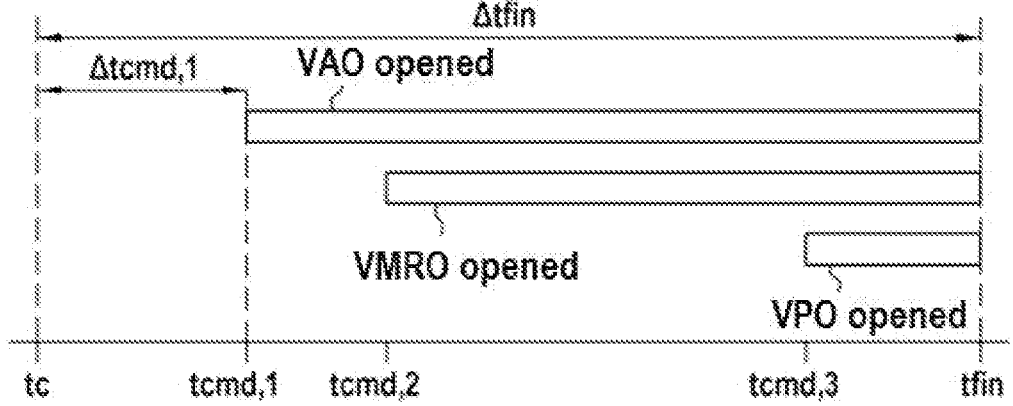

[Fig. 5]
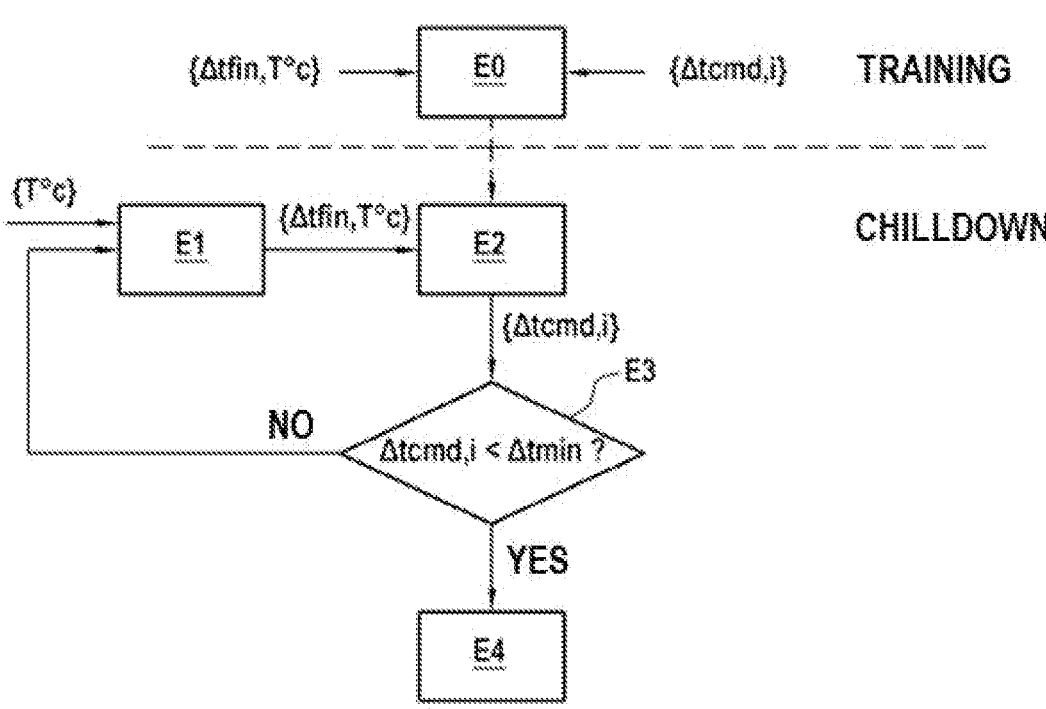

REFRIGERATION METHOD USING AN ARTIFICIAL NEURAL NETWORK

CROSS-REFERENCE TO RELATED APPLICATIONS

This application is a National Stage Application of International Application PCT/FR2021/050177, filed on Feb. 1, 2021, now published as WO 2021/156561 A1, and which claims priority to French patent application FR2001092, filed on Feb. 4, 2020.

TECHNICAL FIELD

This invention relates to the field of chill down of cryogenic systems, and particularly thrusters that use cryogenic propellant.

PRIOR ART

Before a cryogenic system is set in operation, it is known for it to have a chill down phase in which at least some critical members of the cryogenic system are brought from an ambient temperature to the nominal operating temperature of the cryogenic system, and this is normally done gradually so as to avoid thermal shock when the cryogenic system is set in operation.

More specifically, in a cryogenic propulsion system, the chill down may have the objective of avoiding the appearance of at least the following phenomena:

cavitation in at least one cryogenic propellant feed pump, causing an over speed of the pump and a drop in performance, embrittlement of materials because of thermal shocks, loss of sealing following uncontrolled thermal gradients, heating and divergence of bearings, and static and/or dynamic imbalances of rotary parts, because of play in the bearings.

This chill down can thus normally be completed when certain functional criteria are met, such as for example a wall temperature, a threshold of clearance between mechanical components, or another criterion related to the mechanical strength of components such as, inter alia, bearings, flanges, tie rods or splines, or the subsequent operation of the cryogenic system (for example, the non-cavitation of pumps, or the subsequent reproducible filling of parts of the cryogenic system with a cryogenic fluid of homogenous, monophasic operation). These functional criteria may be transposed into measurable end-of-chill down criteria, which can be used in monitoring logic to enable the cryogenic system to be set in operation.

However, when the chill down must be completed by a predetermined time, for example before a scheduled reignition of a cryogenic propellant thruster in flight, sequences of opening of one or more valves of the cryogenic fluid supply circuit must normally be predetermined in order to meet the predetermined chill down criteria at the predetermined time at which the chill down is to be completed, and this must be done independently of many initial parameters, including in particular the physical state (temperatures, pressures) of the supply circuit before the chill down, which can be very variable. To be sure to meet the chill down criteria at the predetermined time, even in the most unfavorable circumstances, valve opening sequences are defined which, in a high proportion of cases, will cause pointless overconsumption of cryogenic fluid. When a propellant is used as a cryogenic chill down fluid, this overconsumption is a waste that penalizes the performance of the thruster, which could have used this propellant for example to generate thrust.

However, the modeling of the cryogenic fluid supply circuit to make provision for the valve opening sequences that are truly necessary to meet the predetermined chill down criteria at the predetermined time of completion of the chill down is made very difficult by the complexity of the circuit and the physical phenomena associated with chill down (e.g. the presence of biphasic flows). However, the resources available for the processing of data during a chill down, for example in an integrated computer of a control unit of a propellant supply circuit of a space launcher, can be very limited.

PRESENTATION OF THE INVENTION

This disclosure makes provision for a method for chilling down a cryogenic fluid supply circuit, with a valve opening sequence adjustable as a function of initial parameters to avoid overconsumption of cryogenic fluid, while meeting one or more predetermined chill down criteria at a predetermined time in the future, and doing so with limited data-processing resources.

To do this, a method for chilling down a cryogenic fluid supply circuit according to a first aspect of this disclosure includes a step of acquiring a state value of the cryogenic fluid supply circuit at a current time, a step of computing, by a computer applying an artificial neural network, a corresponding opening time of each valve out of one or more valves of the cryogenic fluid supply circuit to reach, from the state value of the cryogenic fluid supply circuit at the current time, a state of the cryogenic fluid supply circuit meeting one or more predetermined chill down criteria at a predetermined time in the future, and a step of opening each valve at the corresponding time to chill down the cryogenic fluid supply circuit.

Thus, owing to the use of an artificial neural network, it is possible to make provision, as a function of the current physical state of the cryogenic fluid supply circuit, for an appropriate time for opening each valve in order to meet, at the end of the chill down, the predetermined chill down criteria, and this without recourse to a complex physical model requiring a large number of prior experiences or a high-power computer.

The predetermined chill down criteria may in particular comprise the temperature in at least one predetermined position of the cryogenic fluid supply circuit being less than a predetermined temperature threshold. Specifically, they may comprise the temperature in at least one position, or even in more than one position, out of a plurality of predetermined positions of the cryogenic fluid supply circuit, being less than the predetermined temperature threshold. One can thus verify that the temperatures through the cryogenic fluid supply circuit have dropped enough to avoid harmful phenomena such as cavitation, gradients and thermal shocks, etc. Alternatively or as a complement to a temperature threshold, the predetermined chill down criteria may comprise the pressure in at least one predetermined position of the cryogenic fluid supply circuit being greater than a predetermined pressure threshold. However, other criteria may also be envisioned, alternatively or in addition to temperature and/or pressure thresholds in one or more positions of the cryogenic fluid supply circuit, such as for example a cumulative flow rate of cryogenic fluid, a threshold of clearance between mechanical components, or another criterion related to the mechanical strength of components such as, inter alia, bearings, flanges, tie rods or splines, or the subsequent operation of the cryogenic system (for example, the non-cavitation of pumps, or the subsequent reproducible filling of parts of the cryogenic system with a cryogenic fluid of homogeneous and monophasic operation).

To regularly update the prediction for the appropriate time for the opening of each valve, the acquiring and computing steps can be repeated as long as no remaining time until the corresponding time at which each valve must be opened is less than a minimum threshold. The period of repetition of the acquiring and computing steps can be less than or equal to this minimum threshold.

The artificial neural network may comprise several entirely connected layers of several artificial neurons each. It can in particular comprise one or more artificial neurons having, as activation function, an Exponential Linear Unit function, although other activation functions may alternatively be envisioned.

The chill down method can moreover comprise a preliminary step of training the artificial neural network based on experimental data. This preliminary step may comprise several successive cycles, particularly in the form of "epochs", in each of which the set of experimental data crosses the artificial neural network in both directions and a gradient is determined to ensure convergence on an optimization criterion, and is concluded when a measurement of performance of the artificial neural network no longer improves above a predetermined variation threshold over a predetermined number of successive cycles.

A second aspect of this disclosure relates to a control unit of a cryogenic fluid supply circuit. According to this second aspect, this control unit can be able to be connected to one or more sensors to acquire a state value of the cryogenic fluid supply circuit at a current time and to one or more valves of the cryogenic fluid supply circuit to control their opening, and may comprise a computer programmed to apply an artificial neural network to the computing of a corresponding time of opening of each valve, to reach, starting from the state value of the cryogenic fluid supply circuit at the current time, a state of the cryogenic fluid supply circuit meeting one or more predetermined chill down criteria at a predetermined time in the future.

A cryogenic fluid supply circuit may comprise this control unit with said sensors and said valves. It may further comprise one or more turbopumps. The cryogenic fluid may in particular be a propellant. Thus, a thruster may comprise a thrust chamber and this cryogenic fluid supply circuit for supplying the thrust chamber with propellant. This thruster can in particular be part of a space launcher, and more specifically of an upper stage of the spatial launcher, in particular a reignitable upper stage.

BRIEF DESCRIPTION OF THE DRAWINGS

FIG. 1 is a schematic view of a space launcher,

FIG. 2 is a schematic view of a thruster of an upper stage of the launcher of FIG. 1, FIG. 3 is a longitudinal section view of a turbopump of a cryogenic propellant supply circuit of the thruster of FIG. 2, FIG. 4 schematically illustrates the opening sequence of several valves of the same cryogenic propellant supply circuit of the thruster of FIG. 2 for its chill down.

FIG. 5 is a functional diagram of the method for chilling down the same cryogenic fluid propellant circuit of FIG. 2.

DESCRIPTION OF THE EMBODIMENTS

The chill down device as per this disclosure is applicable to the chill down of any cryogenic fluid supply circuit, but particularly the chill down of cryogenic propellant supply circuits, and more specifically for thrusters of space launchers, such as for example the upper stage 101 of the launcher 100 illustrated in FIG. 1, which may be an upper stage reignitable in flight, for example to put several payloads into different orbits.

Such a thruster can take the form of the rocket engine 1 illustrated in FIG. 2. As in the illustrated embodiment, the rocket engine 1 can be a rocket engine using cryogenic fluid propellants, such as for example liquid hydrogen and oxygen, comprising a supply circuit 2, 3 of the thrust chamber 7 for each propellant. The rocket engine 1 may include turbopumps TPH, TPO to impel each propellant through the respective supply circuit. Each turbopump TPH, TPO may comprise a pump part 4a, 5a for pumping the respective propellant, and a turbine part 4b, 5b, coupled to the corresponding pump part 4a, 5a to ensure the actuation of the latter. More specifically, the rocket engine 1 illustrated can be of so-called expander cycle type, wherein the turbine parts 4b, 5b are themselves actuated by one of the propellants after its passing through a regenerative heat exchanger 6 adjacent to the walls of the thrust chamber 7 of the rocket engine 1.

The supply circuits 2, 3 may also include supply valves VAH, VAO interposed between the tanks 10, 11 containing the propellants and the intakes of the pump parts 4a, 5a of the corresponding turbopumps TPH, TPO, drain valves VPH, VPO located on the bypasses 50,51 downstream of each pump part 4a, 5a, to drain, through these bypasses, fluids that have passed upstream through the pumps 4a, 5a, of the bypass valves VBPH, VBPO disposed on bypasses 8,9 around the turbine parts 4b, 5b to allow them to be circumvented by the propellant heated by the exchanger 6, thrust chamber valves VCH, VCO just upstream of the thrust chamber 7, and also a chill down valve VMRO over a duct 52 for the chill down, for example, of bearings of the turbopump TPO. Each supply circuit 2, 3 can moreover include a set of sensors 12, 13. Each of these sets of sensors 12, 13 can in particular comprise temperature, pressure, vibration and/or clearance. The rocket 1 can also comprise a control unit 15, although it is envisageable to have a separate control unit for each supply circuit 2, 3, and in particular to drive their respective chill downs. The control unit 15 can be connected to the sensor assemblies 12, 13, in order to receive one or more values of measurement of a state of each supply circuit 2, 3 at a current time. The control unit 15 can also be connected to each of the abovementioned valves, to control their opening and/or closing, particularly for the chill down of each supply circuit 2, 3. However, the invention is in no way limited to the chill down of such rockets, and can also be applied to the chill down of other types of cryogenic propellant supply circuits, and even to that of other cryogenic fluid supply circuits in general.

The functional criteria to be met for the chill down of the illustrated liquid oxygen supply circuit 3, and specifically of the pump part 5a of its turbopump TPO, illustrated in greater detail in FIG. 3, may comprise, for example, two temperature thresholds $S_1$, $S_2$ and a pressure threshold $S_3$. More specifically, a first criterion can be that the temperature at a first location 21 located near the shaft 22 of the turbopump TPO, between a first pump-side bearing 23 and a second turbine-side bearing 24, is less than the first temperature threshold $S_1$. A second criterion can be that at least two positions out of three different positions 25, 26, 27 on the casing 28 of the turbopump TPO, including for example one position 25 between the bearings 23, 24 and two positions 26, 27 adjacent to the second bearing 24, the temperature is less than the second temperature threshold $S_2$, and the third criterion can be that the pressure at a position 29 in the intake channel of the pump part 5a is greater than a pressure threshold $S_3$. To monitor these criteria and make sure they are met, all the sensors 13 of the cryogenic fluid supply circuit 3 may comprise temperature and/or pressure sensors located at these positions. Other criteria can however be envisioned, alternatively or in addition to temperature and/or pressure thresholds at one or more locations of the cryogenic fluid supply circuit, such as for example a cumulative flow rate of cryogenic fluid, a threshold of clearance between mechanical components, or another criterion related to the mechanical strength of the components, or to the subsequent operation of the cryogenic system.

However, when the chill down must be completed at a predetermined time $t_{fin}$ in the future, for example for a planned reignition of the rocket engine 1, it may be desirable to anticipate in advance the time at which each valve of the circuit must be opened to meet these criteria at the time $t_{fin}$. As illustrated in FIG. 4, this opening may for example follow a sequence in which the supply valve VAO is open first at an instant $t_{cmd1}$, the chill down valve VMRO is then open at a time $t_{cmd2}$, and the drain valve VPO is opened last at a time $t_{cmd3}$, the three valves VAO, VMRO, VPO remaining open starting from their respective opening times until the predetermined time $t_{fin}$.

An embodiment of a method for chilling down the supply circuit 3, can use an artificial neural network programmed in a computer of the control unit 15 to predict the times $t_{cmd,1}$, $t_{cmd,2}$, and $t_{cmd,3}$ at which the respective valves VAO, VMRO, VPO must be opened to meet the chill down criteria of the liquid oxygen supply circuit 3 at the predetermined time $t_{fin}$ in the future, and to do so as a function of the state of the supply circuit 3 at a current time $t_c$. This artificial neural network may comprise several entirely connected layers of artificial neurons. For example, the artificial neural network may comprise five layers with 12, 24, 24, 24, and 3 artificial neurons respectively.

Each of the artificial neurons may have, as an activation function, an Exponential Linear Unit (ELU), according to the following formula:

$$f(x) = \begin{cases} x, & x > 0 \\ \propto \cdot (e^x - 1), & x \le 0 \end{cases} \qquad \text{[Math. 1]}$$

In this formula, the coefficient $\propto$ can be a real number equal to or greater than zero. When this coefficient $\propto$ is equal to zero, this function is rather named Rectified Linear Unit (ReLU), but it can still be considered as a special case of the Exponential Linear Unit function. However, other functions known to those skilled in the art, such as for example a SOFTPLUS function, could alternatively be used as activation functions.

To allow the artificial neural network to predict opening times $t_{cmd,i}$ of each valve to meet chill down criteria at the predetermined time $t_{fin}$ in the future, as a function of the state of the supply circuit at a current time $t_c$, the chill down method may comprise a prior step E0 of training the artificial neural network in which the network is supplied with previously acquired experimental data, such as input and output vectors, in a succession of cycles or epochs, to create a computer model of the supply circuit, as illustrated in FIG. 5. The input vectors can take the form $\{\Delta t_{fin}, T° c.\}$, in which $\Delta t_{fin}$ represents the remaining time to the predetermined time $t_{fin}$, starting from the current time $t_c$, as illustrated in FIG. 4, and $T°$ c., represents the state of the supply circuit at the current time $t_c$, for example in terms of temperatures and/pr pressures at predetermined positions of the supply circuit, although other parameters may be chosen, such as mechanical clearance. The output vectors may take the form $\{\Delta t_{cmd,i}\}$, in which $\Delta t_{cmd,i}$ represents the remaining time, starting from the current time $t_c$, until the opening time t undo of each valve. The prior training step E0 can be concluded when a measurement of performance, such as for example the loss function, of the artificial neural network does not improve above a predetermined variation threshold over a predetermined number of successive cycles (epochs). The term "variation" should be understood to mean in particular a difference between the value of the loss function at each cycle and the minimum value of the loss function from the start of this prior training step. The predetermined variation threshold can for example be 0.1, and said predetermined number of cycles can for example be 500.

When the artificial neural network has been trained in the prior step EU, it can be programmed on the computer of the control unit 15, which can thus apply it to determine in real time the opening times t undo of each valve to meet chill down criteria at the predetermined time $t_{fin}$ in the future, as a function of the state of the supply circuit at a current time $t_c$. To do this, in an acquiring step E1, the state value $T°$ c. of the supply circuit at the current time $t_c$ is acquired by the control unit 15 through the assembly of sensors 13. Next, in a computing step E2, the computer of the control unit 15 can apply the artificial neural network by introducing into it the state value $T°$ c. of the supply circuit at the current time $t_c$, with the remaining time $\Delta t_{fin}$ until the predetermined time $t_{fin}$, as the input vector $\{\Delta t_{fin}, T° c.\}$, to thus obtain an output vector $\{\Delta t_{cmd,i}\}$ of remaining times $\Delta t_{cmd,i}$ starting from the current time $t_c$, until the opening time $t_{cmd,i}$ of each valve.

Next, in a comparing step E3, the values of the remaining times $\Delta t_{cmd,i}$ until the opening time $t_{cmd,i}$ of each valve can be compared with a minimal threshold $\Delta t_{min}$ of, for example, 5 s, to determine whether or not the remaining time $\Delta t_{cmd,i}$ until the opening time $t_{cmd,i}$ of at least one of the valves is less than this minimum threshold $\Delta t_{min}$. As long as the remaining time $\Delta t_{cmd,i}$ is not yet less than the minimum threshold $\Delta t_{min}$ for any of the valves, the acquiring E1 and computing E2 steps can be repeated to update the remaining time estimates $\Delta t_{cmd,i}$ starting from the current time $t_c$, until the opening time t cmd,i of each valve. The period of repetition of the acquiring E1 and computing E2 steps can be less than or equal to the minimum threshold $\Delta t_{min}$. If, however, the remaining time $\Delta t_{cmd,i}$ for at least one of the valves is less than the minimum threshold $\Delta t_{min}$, the cyclic repetition of the acquiring E1 and computing E2 steps can be interrupted, and the method can progress to a step E4 of opening the valves at the respective opening times $t_{cmd,i}$ computed at the last repetition of the computing step E2, in such a way as to carry out the chill down and meet chill down criteria at the predetermined time $t_{fin}$ when the chill down can be completed.

Although this invention has been described with reference to a specific exemplary embodiment, it is obvious that different modifications and changes can be made to these examples without departing from the general scope of the invention as defined by the claims. Furthermore, individual features of the different embodiments described can be combined in additional embodiments. Consequently, the description and the drawings may be considered in an illustrative sense rather than a restrictive one.

The invention claimed is:

1. A method for chilling down a cryogenic fluid supply circuit comprising:

training an artificial neural network based on experimental data, acquiring a state value of the cryogenic fluid supply circuit at a current time, computing, by a computer applying the artificial neural network, a corresponding opening time of each valve out of one or more valves of the cryogenic fluid supply circuit to reach, from the state value of the cryogenic fluid supply circuit at the current time, a state of the cryogenic fluid supply circuit meeting one or more predetermined chill down criteria at a predetermined time in a future, and opening each valve at the corresponding time to chill down the cryogenic fluid supply circuit.

2. The method for chilling down the cryogenic fluid supply circuit as claimed in claim 1, wherein the predetermined chill down criteria comprise a temperature in at least one predetermined position of the cryogenic fluid supply circuit being less than a predetermined temperature threshold.

3. The method for chilling down the cryogenic fluid supply circuit as claimed in claim 2, wherein the predetermined chill down criteria comprise the temperature in at least one position out of a plurality of predetermined positions of the cryogenic fluid supply circuit being less than the predetermined temperature threshold.

4. The method for chilling down the cryogenic fluid supply circuit as claimed in claim 3, wherein the predetermined chill down criteria comprise the temperature in more than one position out of the plurality of predetermined positions of the cryogenic fluid supply circuit being less than the predetermined temperature threshold.

5. The method for chilling down the cryogenic fluid supply circuit as claimed in claim 1, wherein the predetermined chill down criteria comprise a pressure in at least one predetermined position of the cryogenic fluid supply circuit being greater than a predetermined pressure threshold.

6. The method for chilling down the cryogenic fluid supply circuit as claimed in claim 1, wherein the acquiring and computing steps are repeated as long as no remaining time until the corresponding time at which each valve must be opened is less than a minimum threshold.

7. The method for chilling down the cryogenic fluid supply circuit as claimed in claim 1, wherein the artificial neural network comprises several entirely connected layers of several artificial neurons each.

8. The method for chilling down the cryogenic fluid supply circuit as claimed in claim 1, wherein the artificial neural network comprises one or more artificial neurons having, as activation function, an Exponential Linear Unit function.

9. The method for chilling down the cryogenic fluid supply circuit as claimed in claim 1, wherein the training step comprises successive cycles and is concluded when a measurement of performance of the artificial neural network no longer improves above a predetermined variation threshold over a predetermined number of successive cycles.

10. A control unit of a cryogenic fluid supply circuit, configured to be connected to one or more sensors to acquire a state value of the cryogenic fluid supply circuit at a current time and to one or more valves of the cryogenic fluid supply circuit to control their opening, and comprising a computer programmed to apply an artificial neural network, preliminarily trained based on experimental data, to the computing of a corresponding time of opening of each valve to reach, starting from the state value of the cryogenic fluid supply circuit at a current time, a state of the cryogenic fluid supply circuit meeting one or more predetermined chill down criteria at a predetermined time in a future.

11. A cryogenic fluid supply circuit comprising one or more sensors, one or more valves, and a control unit connected to the sensors to acquire a state value of the cryogenic fluid supply circuit at a current time and to the valves to control opening of the valves, the control unit comprising a computer programmed to apply an artificial neural network, preliminary trained on experimental data, to the computing of a corresponding time of opening of each valve to reach, starting from a state value of the cryogenic fluid supply circuit at a current time, a state of the cryogenic fluid supply circuit meeting one or more predetermined chill down criteria at a predetermined time in a future.

12. The cryogenic fluid supply circuit as claimed in claim 11, further comprising one or more turbopumps.

13. The cryogenic fluid supply circuit as claimed in claim 11, wherein cryogenic fluid is a propellant.

14. A thruster comprising a thrust chamber and the cryogenic fluid supply circuit as claimed in claim 13 for supplying the thrust chamber with propellant.

* * * * *